No. 695,252. Patented Mar. 11, 1902.
B. WATSON.
MAIL BAG CATCHER.
(Application filed Aug. 23, 1901.)
(No Model.)
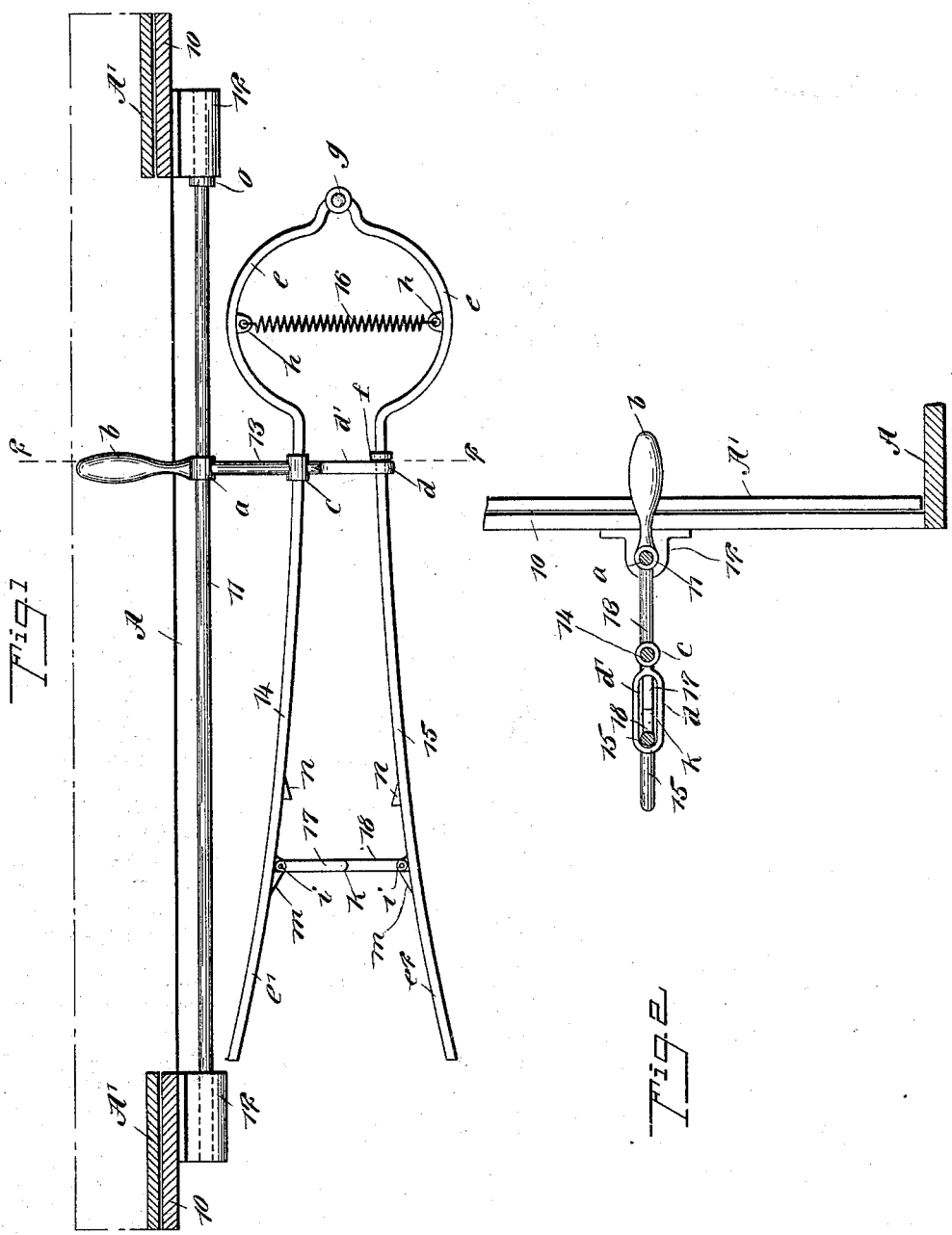
WITNESSES:
J. A. Brophy
Wm. P. Patton
INVENTOR
Benjamin Watson
BY
ATTORNEYS

UNITED STATES PATENT OFFICE.

BENJAMIN WATSON, OF EDEN, NEW YORK.

MAIL-BAG CATCHER.

SPECIFICATION forming part of Letters Patent No. 695,252, dated March 11, 1902.

Application filed August 23, 1901. Serial No. 73,018. (No model.)

*To all whom it may concern:*

Be it known that I, BENJAMIN WATSON, a citizen of the United States, and a resident of Eden, in the county of Erie and State of New York, have invented a new and Improved Mail-Bag Catcher, of which the following is a full, clear, and exact description.

The object of this invention is to provide novel, simple, and practical details of construction for a mail-bag catcher which adapt it for reliably catching and holding a mail-bag at either side of a car with safety to the operator of the device and without injury to the mail-bag.

The invention consists in the novel construction and combination of parts, as is hereinafter described, and defined in the appended claims.

Reference is to be had to the accompanying drawings, forming a part of this specification, in which similar characters of reference indicate corresponding parts in both figures.

Figure 1 is a sectional plan view in part of a car-body and a plan view of the improvement applied thereon, and Fig. 2 is a transverse sectional view substantially on the line 2 2 in Fig. 1.

The body portion A of the mail-car represented is at the side door-opening, of which 10 10 represents the vertical jambs, and, as usual, the slidable doors A' are provided for closing said opening, the doors being shown partially in the drawings.

Upon the jambs 10, at a suitable distance above the floor of the mail-car, a carrier-rod 11 is loosely supported in a horizontal position by the two similar bracket-blocks 12. The end portions of the rod 11 are adapted to slide endwise and rock in perforations of the bracket-blocks for a purpose that will be hereinafter described. An arm 13 is rigidly secured upon the carrier-rod 11, said rod passing through the perforated boss $a$, integrally formed on the arm at a proper distance from its end $b$, that forms a handle for the complete device, as will presently be explained. In alinement with the handle-piece $b$ the main portion of the arm 13 is extended from the boss $a$, and at a suitable distance from said boss another laterally-perforated boss $c$ is formed on the arm. A portion $d$ of the arm 13 projects beyond the boss $c$ and is longitudinally slotted in a horizontal plane, as shown at $d'$ in Fig. 2, and a collar $f$ on the arm 15 affords support for the outer end of the transverse arm 13.

Two bag-catcher arms 14 15 are provided, of similar form and preferably made of cylindrical metal bars. Near like ends of arms 14 15 a lateral bend $e$ in curved form is produced on each one of said arms, and at the extremities thereof, adjacent to said bends, the catcher-arms 14 15 are pivoted together, as shown at $g$ in Fig. 1, which disposes the bends in the same plane, but projected outwardly or away from each other. The catcher-arm 14 is passed through the perforated boss $c$ and is therein secured near the bend $e$ of said arm, and the free end $e'$ of the arm is curved outward a proper degree, as shown in Fig. 1. The other catcher-arm 15 is loosely passed through the slot $d'$ and curves outwardly, as at $e^2$, these curvatures $e'$ $e^2$ on the catcher-arms 14 15 being provided to enable the free entrance of a mail-bag between them, assuming that the bag is hung in the usual way upon a post or other support near the railroad-track whereon the mail-car is drawn. A strong coiled spring 16 is held under tension between the curved portions $e$ $e$ of the catcher-arms 14 15 by an engagement of ends of the spring with perforated ears $h$, that are formed or secured on the arms at their bends, as is shown in Fig. 1, and the pull of the taut spring 16 serves to normally draw the catcher-arms toward each other.

At a proper distance from the free ends $e'$ $e^2$ of the catcher-arms 14 15 two similar spreader-arms 17 18 are jointed thereon by one end of each arm and at opposite points in the same plane, as shown at $i$. The spreader-arms 17 18 being respectively hinged upon the inner sides of the catcher-arms 14 15 are adapted to fold against the arms in direction of the arm 13. The ends $k$ of the spreader-arms 17 18, that meet when they are in opened adjustment, are preferably formed one concave and the other convex, which detachably locks said ends together when the arms are alined and serve to hold the outer catcher-arm 15 diverging from the other arm 14 the limit of the slot $d'$, which checks the arm 15 from improper spreading movement and prevents straining of the spring 16. Similar inclined projections $m$ are formed forwardly of the hinge-joints $i$ and adjacent thereto, which afford abutments that limit the forward rocking movement of the spreader-arms to a degree that will effect the alinement of said arms, as represented in Fig. 1. When folded, the hinges $i$ of the arms 17 18 are covered by the projections $m$, that, as shown, slope forwardly, and thus prevent the mail-bag that may enter between the catcher-arms 14 15 from injurious abrasion. Another inclined projection $n$ is formed on each catcher-arm 14 15 at such distances from the hinge-joints $i$ as to nearly contact with the free ends of the spreader-arms 17 18 when they are folded forwardly. It will be seen that by provision of the sloping projections $n$ the ends $k$ of the spreader-arms 17 18 will be protected, so that if a mail-bag has been introduced forcibly between the catcher-arms and folds the arms 17 18 a withdrawal of the bag will not occasion injury to it, as the ends of the arms cannot have contact therewith.
It should be understood that the length of the entire catcher device is so proportioned as to permit the arms 14 15 to be rocked into the car through the door-opening by manipulation of the handle $b$ when the carrier-rod 11 is properly engaged with the bracket-blocks 12, and to define its correct longitudinal position thereon a collar $o$ is formed or secured on one end portion of the rod 11, that will check the movement of the rod and prevent its displacement in a rearward direction, the operator who holds the handle $b$ preventing the catcher device from improper movement in the opposite direction by pressing the catcher rearwardly when in use.
To further detail the operation, the person whose duty it is to operate the improved catcher device on a mail-car grasps the handle $b$ and rocks the normally pendent arm 15 along with the other catcher-arm 14 into a horizontal plane, as shown in the drawings, this adjustment being effected when the mail-car is approaching a point where a mail-bag may be hung for transfer into the car nearing it, the arms 14 15 at this time being held diverged by an alined adjustment of the spreader-arms 17 18, that causes contact of their ends $k$. Upon contact of a pendent mail-bag (not shown) with the spreader-arms 17 18 said arms will instantly be folded toward the projections $n$ and permit the mail-bag to pass between the catcher-arms 14 15, whereupon the stress of the contractile spring 16 will cause such a gripping embrace of the mail-bag as to hold it suspended between the catcher-arms. The operator upon entrance of the mail-bag between the arms 14 15 immediately rocks the arm 13 by manipulation of the handle $b$, so as to give the outer arm 15 a half-revolution toward and int othe mail-car, which will of course carry the mail-bag into the car, so that it may be released from the grip of the catcher-arms and they be permitted to resume a normal position, or the entire device may be removed from the bracket-blocks 12 and stowed in a convenient place in the car for reuse, as occasion may require.

It is intended to employ the single catcher device for transfer of mail-bags into the car through either side door thereof, and to facilitate this it is to be understood that two bracket-blocks 12 are to be secured on the jambs of each opposite side door-opening usually provided for a mail-car.

Having described my invention, I claim as new and desire to secure by Letters Patent—

1. The combination with a supported carrier-rod, of two similar catcher-arms pivoted together at one end, a spring adapted to pull the free ends of the catcher-arms toward each other, means for temporarily holding the arms spread against the pull of the spring, and means to support the catcher-arm on the supported carrier-rod so as to be rocked therewith.

2. The combination with bracket-blocks at the door of a car, and a carrier-rod loosely supported on said bracket-blocks, of two similar catcher-arms pivoted together at one end, a spring near the pivot-joint adapted to pull the free ends of the catcher-arms toward each other, spreader-arms held to rock on the catcher-arms and adapted to hold the catcher-arms diverged against the pull of the spring, and means to support the catcher-arms on the carrier-rod so as to be rocked therewith.

3. The combination with two catcher-arms oppositely bent near one end, and pivoted together at the terminations of said bent ends, a contractile spring secured by its ends between the bent portion of the catcher-arms, opposite end portions of said arms being bent outwardly in the same plane with the bends whereon the spring is secured, means for temporarily holding the arms spread apart at their free ends against the pull of the spring, and means for rockably supporting the catcher-arms on a car at its door.

4. The combination with a carrier-rod, and bracket-blocks having alined perforations, and secured oppositely on a car-frame at its door-opening, for a loose reception of the carrier-rod, of two similar catcher-arms curve-bent near one end of each arm and pivoted together near said curve-bent ends, a contractile spring held by its ends on the curved bent portions of the catcher-arms, the free ends of these arms being outwardly bent, two spreader-arms hinged oppositely on inner sides of the catcher-arms, said spreader-arms when alined holding the catcher-arms diverged against the pull of the spring, and a transverse arm secured on the carrier-rod and also upon one catcher-arm, the other catcher-arm having a slidable engagement with a slotted portion of the transverse arm.

In testimony whereof I have signed my name to this specification in the presence of two subscribing witnesses.

BENJAMIN WATSON.

Witnesses:
H. J. WEYAND,
HENRY KREISS.